March 20, 1962 J. A. AURAND ET AL 3,026,504

INFORMATION TRANSMISSION SYSTEM

Filed May 1, 1956 2 Sheets-Sheet 1

INVENTORS
LESTER S. LAPPIN
& JAMES A. AURAND
BY Morris A. Rabkin
ATTORNEY

March 20, 1962 J. A. AURAND ET AL 3,026,504

INFORMATION TRANSMISSION SYSTEM

Filed May 1, 1956 2 Sheets-Sheet 2

INVENTORS
LESTER S. LAPPIN &
JAMES A. AURAND
BY Morris L. Rabkin
ATTORNEY

United States Patent Office 3,026,504
Patented Mar. 20, 1962

3,026,504
INFORMATION TRANSMISSION SYSTEM

James A. Aurand, Collingswood, and Lester S. Lappin, Merchantville, N.J., assignors to Radio Corporation of America, a corporation of Delaware Filed May 1, 1956, Ser. No. 582,036
3 Claims. (Cl. 340—206)

The present invention relates to information transmission systems, and more particularly to a system for the transmission or telemetering of information indicative of the operation of remotely located equipment, such as unattended communications equipment and the like.

Briefly described, the invention incorporates means for transmitting a series of electrical impulses at spaced time intervals. These time intervals represent the information that is transmitted. At the receiving station, apparatus is provided for producing an indication representative of the time intervals between the pulses. This indication, consequently, is representative of the information transmitted.

The need for an uncomplicated system for telemetering information, such as is necessary to monitor remotely located equipment, for example, has long been recognized. Recently developed automation techniques incorporating automatic control devices are being more widely utilized. With automatic control, it is most desirable to monitor the operation of equipment on instruments at a central station which may be distant from the equipment.

A telemetering system provided by the present invention achieves greater reliability by virtue of the use of relatively few parts and the elimination of parts that are subject to failure.

Telemetering systems for obtaining readings of remotely located meters and other instruments have been proposed. However, no known prior telemetering systems provide the reliability, accuracy and simplicity inherent in a telemetering system incorporating the present invention. In some prior systems, mechanically moving parts, such as rotating switches and rheostats, are associated with the equipment to be monitored. It will be appreciated that such systems are subject to failure due to wearing of the moving parts.

Mechanically moving parts impose intrinsic limitations on the maximum speed of information transfer. Consequently, a considerable delay may exist between the transmission and reception of the transmitted information.

Other systems are known which transmit impulses of varying durations, the duration of an impulse being determined by the function being transmitted. It has been found, however, that such impulse duration telemetering systems require more parts than a system constructed in accordance with the present invention. Furthermore, many of the parts required in an impulse duration system are subject to failure and require periodic replacement.

In a telemetering system, designed in accordance with the present invention, there may be included a circuit whereby reference impulses of one polarity are produced, these impulses being repetitive at given intervals. Impulses of opposite polarity are produced by the circuit. These impulses of opposite polarity are also repetitive. However, the interval between successive ones of these impulses of one polarity and impulses of opposite polarity is proportional to the function being monitored. For example, the magnitude of a current may determine the interval between the successive pulses of opposite polarity. The impulses of both polarities are combined and transmitted in any convenient manner, as over a telephone line, to a remote central monitoring station.

It has been found that the transmitter equipment necessary to produce the spaced impulses may be constructed without the need for parts, such as electron tubes, that are subject to failure. Consequently, this equipment, which may be located at a place remote from the central station, can be depended upon for long reliable operation.

The transmission of information in the form of impulses of opposite polarity lends itself to uncomplicated and reliable receiving equipment. One of the impulses may be used to initiate an operation, whereas the following pulse of opposite polarity may terminate an operation. It follows that current flowing to an integrating device, such as a meter which monitors the information, may be controlled by the impulses. The current flow to a meter may thus be determined by the interval between successive pulses of opposite polarity.

It is, consequently, an object of the present invention to provide an improved system for the transmission or telemetering of information.

It is a further object of the present invention to provide an improved telemetering system adapted to monitor remotely located equipment, such as radio transmitters.

It is a still further object of the present invention to provide an improved telemetering system for the purpose of measuring an electrical quantity, such as a current, in equipment remote from a measuring instrument.

It is a still further object of the present invention to provide an improved telemetering system having greater reliability than prior systems, in that not only fewer parts are employed, but these fewer parts are of the type that are not subject to failure.

It is a still further object of the present invention to provide an improved telemetering system in which mechanically moving parts are eliminated.

It is a still further object of the present invention to provide an improved telemetering system for accurate high speed transmission of information which is less complex and lower in cost than known systems.

Other objects and advantages of the present invention will, of course, become apparent and immediately suggest themselves to those skilled in the art to which the invention is directed from a reading of the following specification in connection with the accompanying drawings in which.

Figure 1:
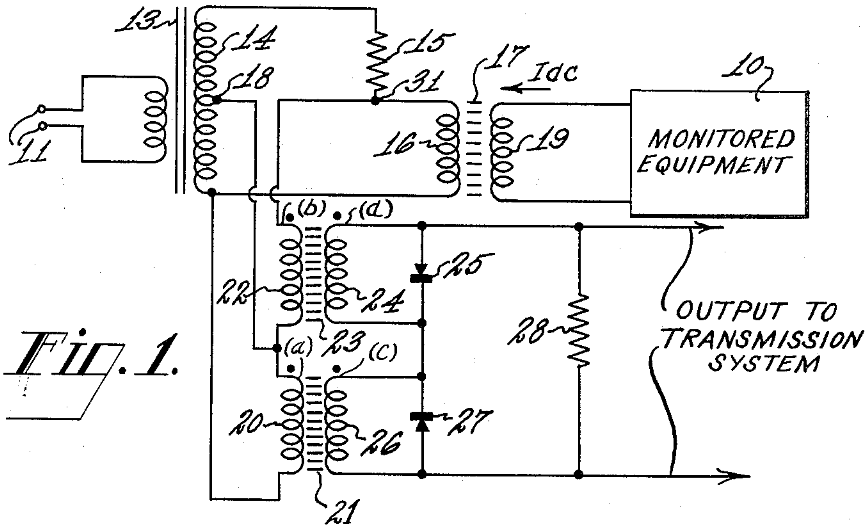
FIG. 1 is a schematic diagram of the transmitter portion of a telemetering system embodying features of the present invention.

Referring now to FIG. 1, it may be observed that the basic components in the transmitter portion of a system incorporating the invention are transformers, resistors and diodes. These diodes may be crystal or semi-conductor diodes. Such components are not ordinarily subject to failure. The transmitter portion of the system is located at a remote point from the central control station and may be incorporated as a part of the monitored equipment 10. The monitored equipment may be a radio transmitter, such as is located in an unattended radio relay station. Consequently, a feature of the transmitter portion of a telemetering system of the present invention is that it will not normally be subject to failure, so that very little maintenance and inspection is required.

Any convenient source of alternating current, such as the power lines, has been found to serve very effectively as a source of power and of reference frequency signals. The power lines may be connected to the input terminals 11 of the primary winding 12 of an iron core transformer 13. This transformer 13 has a center tapped secondary winding 14. The secondary winding 16 of a saturable core transformer 17 is connected in series with a resisttor 15, and the saturable core transformer secondary 16 and the resistor 15 are connected between the opposite ends of the secondary winding of the transformer 13. It may thus be observed that the secondary 14 of the transformer 13, the resistor 15, and the inductance provided by the secondary 16 of the saturable core transformer 17 provide a phase shifting network of conventional design. The voltage obtained between the center tap 18 of the secondary 14 and the junction 31 of the resistor 15 and the saturable core transformer secondary 16 will vary in phase with respect to the voltage across the secondary 14 of the transformer 13. This variation in phase will be a function of the variation in value of the resistance of the resistor 15 or of the variation in value of the inductance of the secondary 16 of the saturable core transformer 17. It is convenient to provide for the variation of the inductance of the secondary 16 of the saturable core transformer 17 by providing a variable magnitude of direct current flow through the primary winding 19 of the saturable core transformer 17. For a description of the phase shifting circuit which is utilized in the illustrative embodiment shown in FIG. 1, reference may be had to the text "Applied Electronics" by Members of the Staff of the Department of Electrical Engineering, Massachusetts Institute of Technology, published by John Wiley and Sons, New York (1943) on page 317.

A direct current is indicated in the drawing as being applied to the primary winding 19 of the saturable core transformer 17 from the monitored equipment 10. A typical application of the present invention would be in measuring the plate current in the final amplifier of a radio transmitter. Thus, the primary winding 19 of the saturable core transformer 17 would be connected in place of the ammeter in the plate circuit of the final amplifier. It will be appreciated, however, that any quantiy that may be represented by an electrical current, or any function that may be represented by an electrical current, may be transmitted by means of this illustrative embodiment of a telemetering system incorporating the present invention.

The bottom half, as viewed in FIG. 1, of the secondary 14 of the transformer 13 is connected across the primary winding 20 of a peaking transformer 21. The voltage developed between the center tap 18 and the junction 31 of the resistor 15 with the saturable core transformer secondary 16 is applied across the primary winding 22 of another peaking transformer 23. The peaking transformers 21 and 23 may be similar. They may be of the type described in the text, "Waveforms," by the M.I.T. Radiation Laboratories Staff, on page 18, published by McGraw-Hill (1949). The secondary winding 24 of the transformer 23 is shunted by a diode 25. The secondary winding 26 of the other transformer 21 is shunted by another diode 27. The cathodes of the diodes 25 and 27 are connected together and the anodes of these diodes 25 and 27 are connected across a load resistor 28. The output of the transmitter portion of the telemetering system is available across the load resistor 28. This output may be applied directly to any transmission system, such as a telephone line, or it may be used to modulate a carrier wave.

Figure 2:
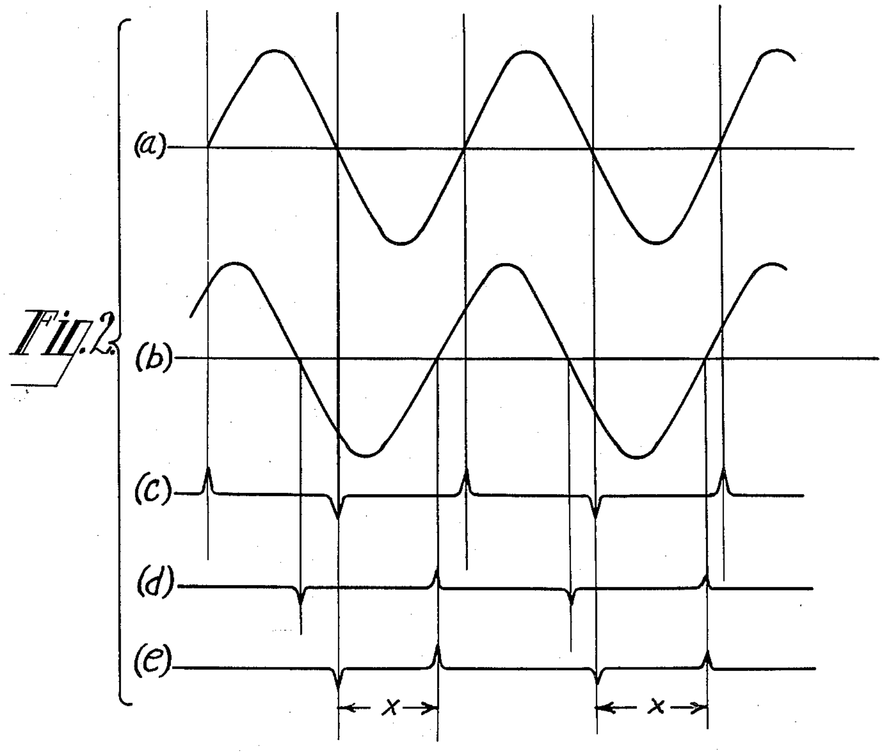
FIG. 2 is a series of waveforms which are produced during the operation of the transmitter portion of the system shown schematically in FIG. 1.

It will be appreciated that the voltage across the lower half of the secondary winding 14 is in phase with the reference voltage applied to the terminals 11. This voltage is represented by the waveform (*a*) of FIG. 2, shown by way of example as a sinusoidal wave. The phase of this voltage is fixed and its magnitude is equal to one-half of the magnitude of the voltage across the entire secondary winding 14. The magnitude of the phase shiftable voltage between the center tap 18 and the junction 31, and the magnitude of the reference voltage across the lower half of the secondary 14 will be equal. The center tap to junction voltage will lead the reference voltage across the lower half of the secondary

14 in phase by an amount which is a function of the magnitude of the inductance of the saturable core transformer secondary 16. The magnitude of this inductance will be a function of the magnitude of the current flow through the primary 19 of the saturable core transformer 17. Consequently, the voltage from the center tap 18 to the junction will lead the reference voltage in phase by an amount which is a function of the magnitude of the direct current flowing through the primary 19 of the saturable core transformer 17.

The voltage between the center tap 18 and the junction 31 is applied across the primary 22 of the peaking transformer 23. This voltage, which is sinusoidal as indicated in the drawing, is indicated by the waveform (*b*) at an instant when it leads the reference voltage which is applied to the primary 20 of the other peaking transformer 21 by a small phase angle. The waveform( *b*) is also shown by way of example as being sinusoidal.

The peaking transformers 21 and 23, respectively, provide positive and negative voltage impulses across the secondaries thereof when the primary voltage applied thereto crosses the zero voltage axis while increasing and while decreasing in magnitude. The pulses provided by the secondary 26 of the peaking transformer 21 from the reference wave are represented in waveform (*c*) of FIG. 2, whereas the impulses provided by the secondary 24 of the other peaking transformer 23 from the phase shiftable wave are represented by the waveform (*d*). The diodes 25 and 27 are polarized in an opposite sense. The dots above one end of the primary and secondary windings of the peaking transformers 21 and 23 indicate, by convention, which of the ends of these windings are instantaneously at the same voltage polarity.

The diode 25 functions to short circuit the secondary 24 of the peaking transformer 23 when positive voltage impulses are produced at the end of the winding 24 coded with a dot. The other diode 27 functions to short circuit the secondary 26 of the other peaking transformer 21 when voltages of negative polarity appear at the coded end of the secondary winding 26. Consequently, only the negative impulses that are provided by the peaking transformer 23 are applied across the load resistor 28, and only the positive impulses that are provided by the peaking transformer 21 are applied across the load resistor 28. The negative impulses will be synchronized with the reference wave, and are, therefore, regularly repetitive. The positive impulses are repetitive. However, the interval between successive negative and positive impulses will depend upon the phase angle by which the phase shifted voltage leads the reference voltage. Consequently, this interval, which is represented by the distance *x* in FIGURE 2, is determined by the magnitude of the direct current that is applied to the primary winding 19 of the saturable core transformer 17. The magnitude of the alternating current voltages with respect to the range of the magnitude of the direct current flowing through the primary winding 19 of the saturable core transformer are chosen so that the phase angle by which the phase shifted voltage leads the reference voltage may vary over a maximum range. Thus, the interval represented by the distance *x* may also vary over a range which, as a maximum, may be equal in time to one-half the period of the alternating current wave.

The speed of information transmission is, consequently, very rapid, since the interval between the positive and negative impulses may change every half-cycle of the alternating current wave. Thus, should still higher frequencies be used, the speed of information transfer may be made practically instantaneous. Prior telemetering systems using mechanically moving parts, such as rotary switches and rheostats, are not capable of achieving this high speed of operation.

Figure 3:
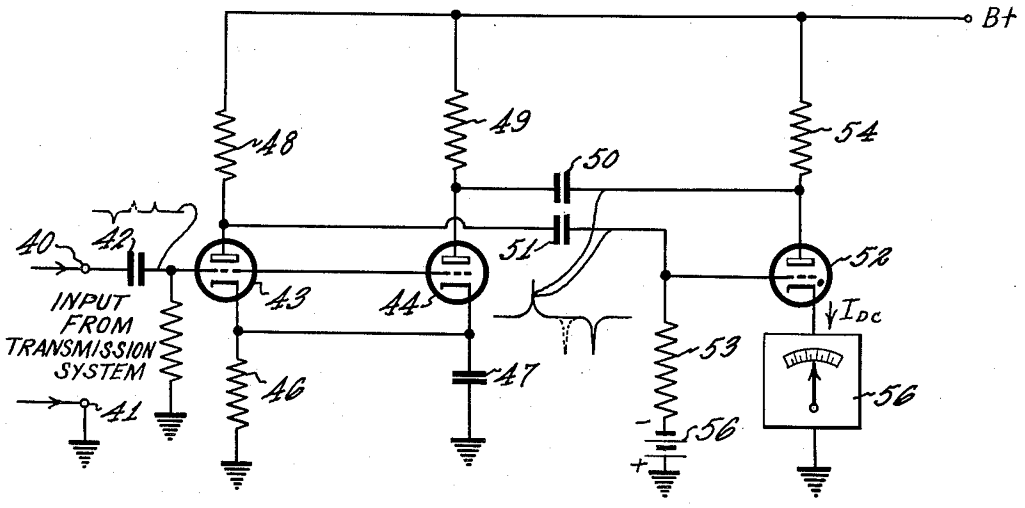
FIG. 3 is a schematic diagram showing an embodiment of the receiver portion of a telemetering system having features of the present invention.

It may be desirable under certain circumstances, such as when low speed of information transfer is contemplated, to use a mechanically variable reactance or resistance element in the phase shift network instead of an electrically variable reactance element. For example, a simple inductor may be used instead of the saturable core transformer 17, and a variable resistor may be used in place of the resistor 15. Mechanism may be provided to change the magnitude of the effective resistance due to the variable resistor in response to the information to be transmitted. Should a current, such as the current, *Idc*, indicated in the drawing, be monitored, it may be used to rotate a motor which operates the resistance changing mechanism. The use of positive and negative impulses permits use of a receiver portion of a telemetering system of less complex design than has heretofore been possible. An embodiment of a receiver portion, that may be used in accordance with the present invention, is illustrated in FIG. 3. The input from the transmission system is applied across a pair of terminals 40 and 41. It is assumed that the signal applied to these terminals 40 and 41 is in the impulse form in which it was transmitted by the transmitter portion. Should the telephone line be used for a transmission system, auxiliary detection equipment may not be necessary. However, any conventional detector circuit suitable for the detection of pulse information may be used as a part of a communication system for transmitting the information over long distances by known carrier transmission techniques. The signal is applied through a capacitor 42 to the grids of a pair of tubes 43 and 44. These tubes are parts of an amplifier providing dual output signals. This amplifier has a common input circuit consisting of the grid resistor 45 and the capacitor 42. A circuit consisting of a resistor 46 and a capacitor 47 is connected to the cathodes of the tubes 43 and 44 for the purpose of providing cathode bias. Each tube 43 and 44 has separate plate resistors 48 and 49, respectively. Operating voltage from a source, illustratively designated at B+, is supplied to the plates of the tubes 43 and 44 through the plate resistors 48 and 49. Dual output signals from the amplifiers are available at the plates of each of the tubes 43 and 44.

The waveform of the input signal that is applied to the grids of the tubes 43 and 44 is indicated by the solid curve in FIGURE 3. This signal is represented as consisting of a negative impulse followed by a positive impulse. The interval between successive negative and positive impulses is determined by the information being transmitted, as described above. An alternative position of the positive impulse, which may occur because of a different phase condition representing different transmitted information, is indicated by the dotted curve. This signal is amplified and inverted in the amplifier tube. The inverted amplified signal is indicated at the output of the amplifier after it has been transmitted through coupling capacitors 50 and 51.

A circuit whereby current flow may be controlled, in accordance with the interval separating successive negative and positive impulses, is provided. This circuit may include a thyratron 52. The grid of the thyratron is connected to the coupling capacitor 51. Thus, one of the dual signals from the amplifier is applied to the grid of the thyratron 52. A grid resistor 53 is connected between the grid and ground. The plate of the thyratron 52 is connected to the coupling capacitor 50. Thus, the other of the dual outputs from the amplifier is applied to the thyratron 52. Operating voltages are provided for the thyratron from B+, through a resistor 54 connected to the plate thereof. An ammeter 56 is connected between the cathode of the thyratron 52 and ground.

The circuit of the thyratron 52 is designed so that the thyratron is normally non-conducting. This may be accomplished by placing a source of negative voltage, illustratively designated as a battery 56, in series with the grid resistor 53. The positive impulses are of a sufficient magnitude to initiate conduction in the thyratron. Once conduction is initiated in a thyratron, it will continue until the voltage on the plate thereof is lowered to below the ionization potential. The negative impulses, which are simultaneously applied to the plate and the grid of the thyratron 52, are of a sufficient amplitude to lower the voltage on the plate below ionization potential. Conduction through the thyratron is cut off on occurrence of a negative impulse. The thyratron, therefore, conducts during the interval between the positive and negative impulses applied thereto. This interval of conduction may vary depending upon the phase of the voltage that produces the negative impulses which are applied to the thyratron 52. The meter 56 may be a direct current ammeter having a moving coil movement of the conventional type. Because of the inertia of this movement, the meter functions as a self-integrating device. Consequently, the reading of the meter will be proportional to the direct current that is supplied to the primary 19 of the saturable core transformer 17 by the monitored equipment 10. The meter scale may be calibrated to indicate the function that is being measured.

The invention, therefore, provides an information transmission or telemetering system utilizing novel principles, whereby reliability, accuracy, high speed of operation and simplicity are achieved.

What is claimed is:

1. An information transmission system comprising means for providing a pair of alternating current waves of like frequency, one of said waves being a reference wave, a phase shifting circuit means including a saturable core transformer for shifting the phase of the other of said pair of waves with respect to said reference wave, means responsive to the information to be transmitted for saturating said transformer, means connecting the output of said saturating means to the input of said phase shifting circuit, peaking transformer means connected to the output of said first named means for providing an impulse at a predetermined point on said reference wave during each cycle to thereby provide a series of reference impulses, second peaking transformer means connected to the output of said phase shifting circuit for providing an impulse at a predetermined point on said other wave during each cycle to thereby provide another series of impulses, and means for transmitting a signal including both of said series of impulses.

2. An information transmission system comprising means for providing a pair of alternating current waves of like frequency, one of said waves being a reference wave, a phase shifting circuit including a saturable core transformer for shifting the phase of the other of said waves with respect to said reference wave, means responsive to the information to be transmitted for saturating said transformer, means connecting the output of said first named means to the input of said phase shifting circuit, a pair of peaking transformers connected to the output of said first named means and said phase shifting circuit for providing an impulse of one polarity and an impulse of an opposite polarity at predetermined points on said reference wave and said other wave, respectively, means for transmitting a signal including said impulses of opposite polarity, and means for receiving said transmitted signal responsive to the interval between said impulses of opposite polarity.

3. An information transmission system comprising means providing a pair of alternating current waves of sinusoidal wave form and constant frequency, one of said pair of alternating current waves being a reference wave, first circuit means including a peaking transformer and a diode for producing output impulses of one polarity at a like point on each cycle of an alternating current wave applied thereto, second circuit means including a peaking transformer and a diode for producing output impulses of an opposite polarity at a like point on each cycle of an alternating current wave applied thereto, phase shifting circuit means including a saturable core transformer, means for applying the other of said pair of alternating current waves to said phase shifting circuit means for providing an output wave shifted in phase with respect to said reference wave, means responsive to the information to be transmitted for saturating said saturable core transformer, means for applying said output wave of said phase shifting circuit means to said first circuit means and said reference wave to said second circuit means, means for combining the output impulses of said first circuit means and said second circuit means to provide a signal including both of said output impulses adapted to be transmitted, and means for transmitting said signal.

References Cited in the file of this patent

UNITED STATES PATENTS

| | | |
|---|---|---|
| 1,885,052 | Smulski | Oct. 25, 1932 |
| 2,081,413 | Thompson | May 25, 1937 |
| 2,089,441 | Smith | Aug. 10, 1937 |
| 2,411,547 | Labin et al. | Nov. 26, 1946 |
| 2,434,965 | Shepherd | Jan. 27, 1948 |
| 2,444,935 | Kurtz | July 13, 1948 |
| 2,452,547 | Chatterjea et al. | Nov. 2, 1948 |
| 2,477,370 | Hana | July 26, 1949 |
| 2,493,508 | Thynell | Jan. 3, 1950 |
| 2,504,975 | Grieg | Apr. 25, 1950 |
| 2,680,241 | Gridley | June 1, 1954 |
| 2,689,952 | Johnson | Sept. 21, 1954 |
| 2,784,255 | Earp | Mar. 5, 1957 |

OTHER REFERENCES

Book by T. S. Gray: Applied Electronics, 2nd ed. published by John Wiley and Sons, New York, 1954. Page 375.